Oct. 31, 1933.  L. E. POOLE  1,933,149
COMMUTATOR REAMING MACHINE
Filed Aug. 9, 1929  3 Sheets-Sheet 3
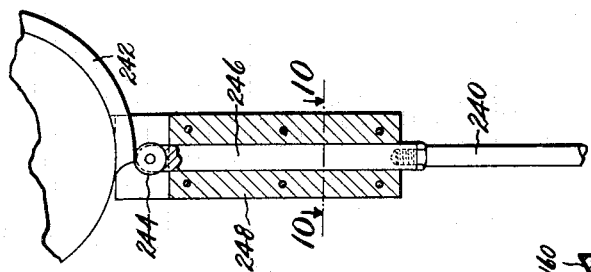
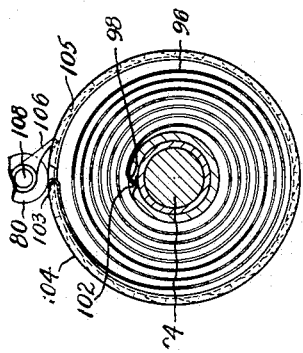
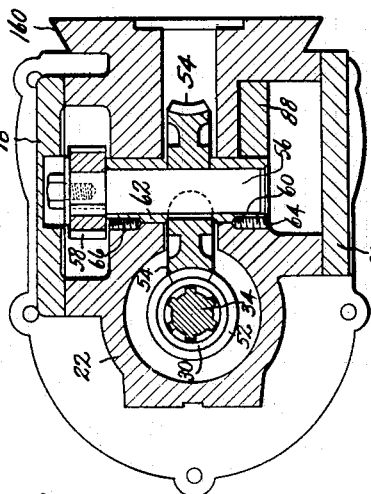
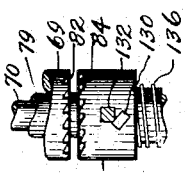
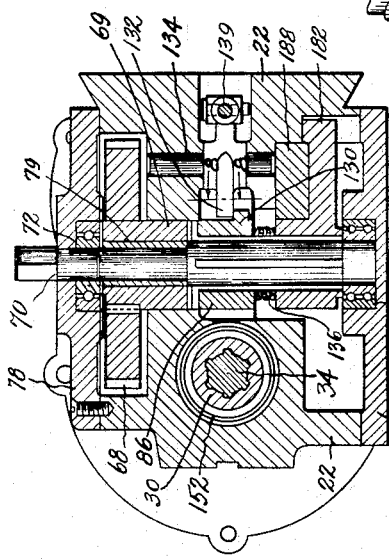
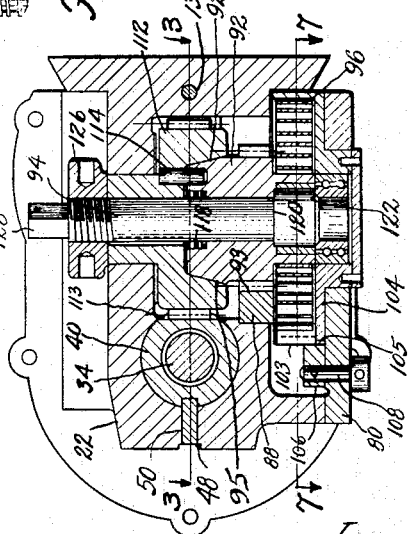

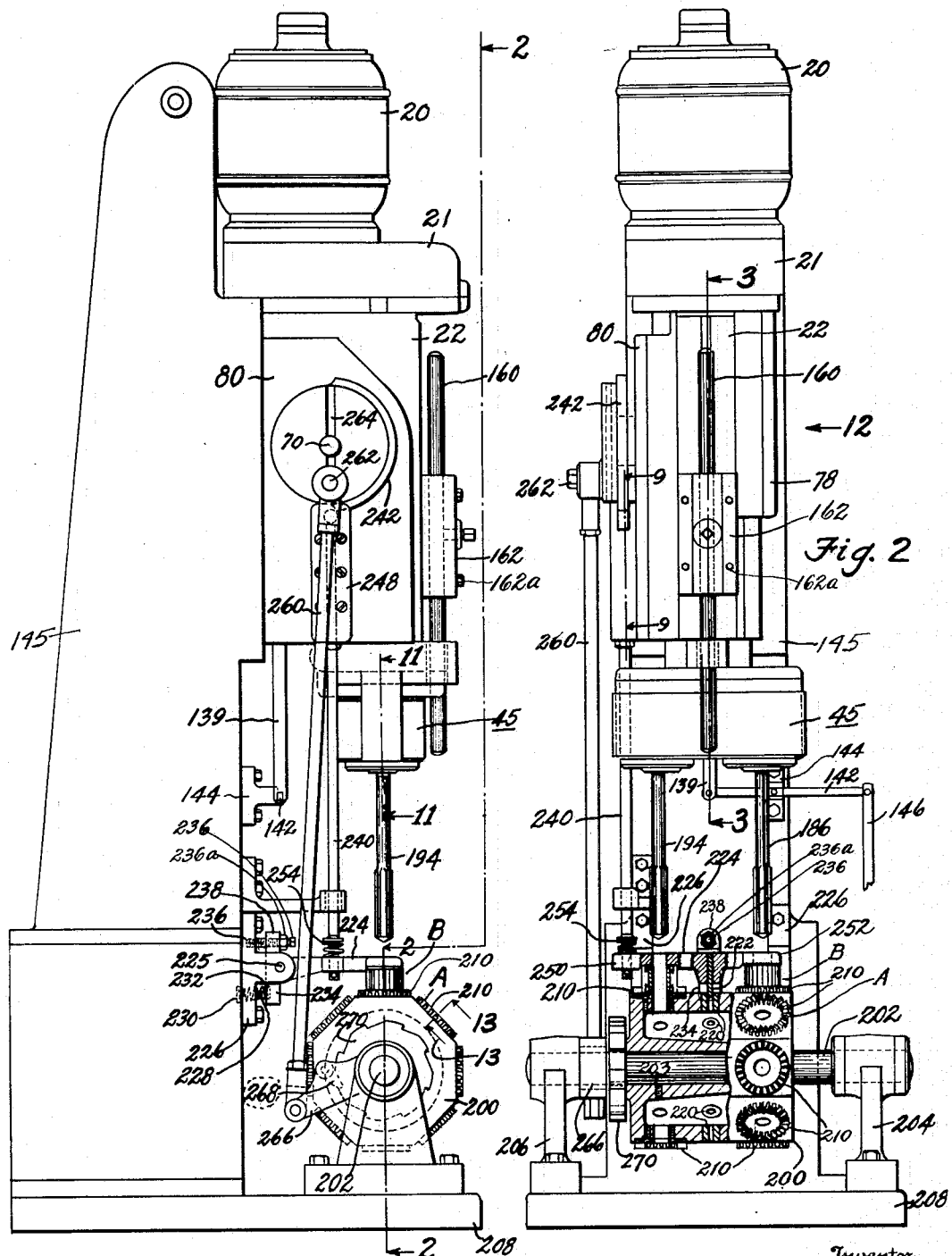

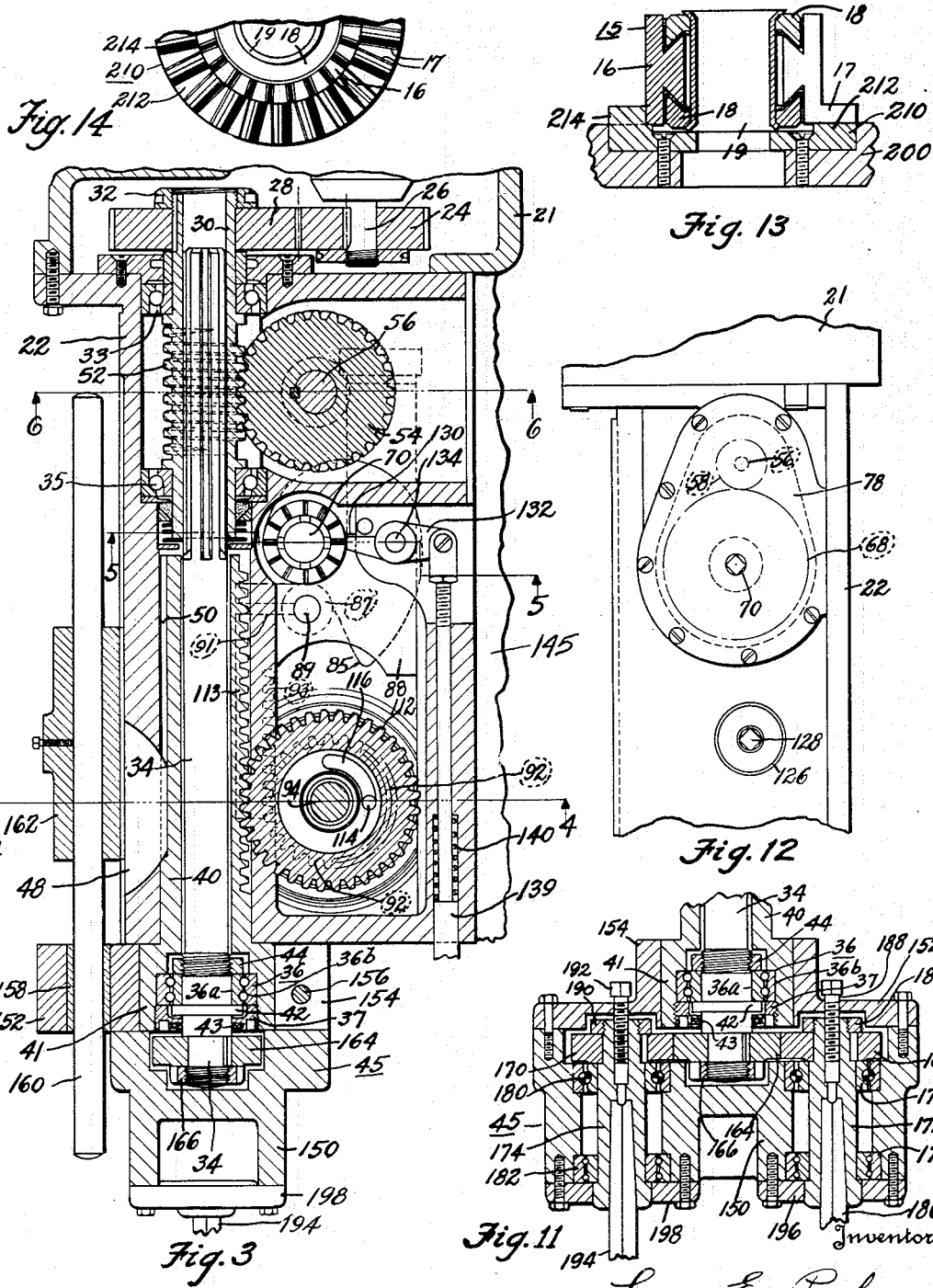

Patented Oct. 31, 1933

1,933,149

UNITED STATES PATENT OFFICE 1,933,149

COMMUTATOR REAMING MACHINE

Lora E. Poole, Anderson, Ind., assignor to Delco Remy Corporation, Anderson, Ind., a corporation of Delaware Application August 9, 1929. Serial No. 384,715

1 Claim. (Cl. 77—63)

This invention relates to a metal working machine, and more particularly to a machine which is provided with a drill press head and with a rotary drum carrying work holders for presenting work pieces in working position so that the drills or reamers carried by the drill press head may be used to perform their operations upon the work pieces.

An object of this invention is to provide means for presenting the work to an operating station. This has been accomplished by providing a rotary drum provided with seats where the work piece may be inserted by the operator, then indexed so as to position the work piece in the operating station.

Another object of this invention is to accurately position the work drum after it has been indexed. This has been accomplished by providing a pilot engaging an aperture in the drum, thereby accurately positioning the drum.

Another object of this invention is to hold the work piece in position while being operated upon by the tool in the drill press head. This has been accomplished by a pivotally mounted member which automatically clamps the work piece to the work holder when the tool carried by the drill press head is advanced towards the work piece and which automatically releases immediately after the tool disengages the work piece.

Another object of this invention is to adjust the tool carrier relative to the work piece. This has been accomplished by providing a pair of members in the feed mechanism for the tool carrier and by providing means for connecting these members together in various positions of adjustment. One of these members terminates in a frustro-conical portion, and the other has a recess with a frustro-conical inner surface, cooperating with the frustro-conical surface of said first member to hold the carrier in adjusted position.

Another object of this invention is to limit the distance through which the tool carrier may be adjusted. This has been accomplished by a pin carried by one of the adjusting members which travels in an arcuate slot in the other member. The relative movement of the two members is limited by the pin engaging the ends of the arcuate slot.

Another object of this invention is to provide means for adjusting the tension of the spring for retracting the tool carrier from the work piece. It is desirable to adjust the tension of the spring for retracting the tool carrier from the work piece for various types of tools and for various positions of the drill press head. If the tool carrier carries a plurality of relatively heavy tools for operating upon the work piece, it is necessary to increase the tension of the spring especially when the tool carrier moves upwardly when being retracted from the work piece. If the drill press head is positioned so that the tool carrier advances upwardly when moving toward the work piece, and downwardly when moving away from the work piece, it certainly is necessary to decrease the tension of the spring so that the tool carrier will not be retracted so rapidly as to cause an undesirable jar. The adjustment of the spring has been accomplished by providing a ratchet held in position by a pawl carried by the drill press housing.

Another object of this invention is to decrease the power required to actuate the tool carrier. This has been accomplished by providing a cam having a cam follower carried by a rack which rotates a rotary driving member, the rack and cam follower being so arranged that the torque due to the couple resulting from the force applied to and the force delivered by the rack is reduced to a minimum.

Another object of this invention is to provide a tool carrier adapted to carry a plurality of tools. This has been accomplished by attaching a housing carrying suitable mechanism for driving each of the tools to the quill carrying the spindle of the drill press head.

Further objects and advantages of the present invention will be apparent from the following description, reference being had to the accompanying drawings, wherein a preferred embodiment of one form of the present invention is clearly shown.

In the drawings:

Fig. 1 is a side elevation of the drill press head and the work presenting drill.

Fig. 2 is a front elevation showing a fragmentary sectional view of the rotary drum taken substantially on the line 2—2 of Fig. 1.

Fig. 3 is a sectional view taken substantially on the line 3—3 of Figs. 2 and 4.

Fig. 4 is a sectional view taken on the line 4—4 of Fig. 3.

Fig. 5 is a sectional view taken on the line 5—5 of Fig. 3.

Fig. 6 is a sectional view taken on the line 6—6 of Fig. 3.

Fig. 7 is a sectional view taken on the line 7—7 of Fig. 4.

Fig. 8 is a fragmentary sectional view taken on the line 8—8 of Fig. 5.

Fig. 9 is a fragmentary sectional view taken on the line 9—9 of Fig. 2.

Fig. 10 is a sectional view taken on the line 10—10 of Fig. 9.

Fig. 11 is a sectional view of the tool carrier taken on the line 11—11 of Fig. 1.

Fig. 12 is a fragmentary side elevation looking in the direction of the arrow 12 of Fig. 2.

Fig. 13 is a fragmentary sectional view taken on the line 13—13 of Fig. 1.

Fig. 14 is a fragmentary plan view of a work holder and a work piece mounted therein.

Figs. 1 and 2 are drawn to a smaller scale than the other figures.

Figs. 13 and 14 are drawn to a larger scale than the other figures.

In the drawings the reference character 15 indicates a commutator having the commutator segments 16 separated by riser bars 17 and insulated from each other and from the clamping rings 18 held in position by the flared tubular rivet 19. After the commutator has been assembled and the tubular rivet 19 flared as disclosed in Figs. 1, 2 and 13 it is necessary to ream the rivet so as to provide a true cylindrical surface before press fitting or otherwise mounting the commutator on the armature shaft. A machine for accomplishing this has been provided which will now be described.

This machine includes an electric motor 20 mounted on the housing 21 which forms a cap for the main frame 22 of the drill press head which is carried by a standard 145. The gear 24 mounted on the armature shaft 26 meshes with the gear 28, keyed to the tubular sleeve 30 and held in position by a collar 32 threadedly engaging the end of the tubular sleeve 30 which is journalled in the end thrust bearings 33 and 35.

A spindle 34 is splined to the tubular member 30 and is journalled in the bearing 36. Endwise movement of the spindle 34 relative to a quill 40 is prevented by a shoulder 42 integral with the spindle 34 and a nut 44 threadedly engaging the spindle, the shoulder and the nut abutting the inner race 36a of the roller bearing 36. The outer race 36b is held in position by a nut 37 engaging the flared end 41 of the quill 40. The nut 37 is provided with an annular groove 43 which is packed by a felt washer or other suitable packing material saturated with oil. A key 48 seated in the frame 22, cooperates with a slot 50 in the quill 40 to permit longitudinal movement and to prevent rotary movement of the quill, as may best be seen in Figs. 3 and 4. A detailed description of the tool carrier 45 will appear later.

A suitable mechanism for feeding the tool carrier 45, spindle 34, and the quill 40 longitudinally toward the work piece will now be described. The tubular sleeve 30 is provided with a worm 52 meshing with a worm gear 54 keyed to the shaft 56, which carries a spur gear 58 (see Figs. 6 and 12). The shaft 56 is journalled in bearings 60 and 62 mounted in the frame 22 and held in position by screws 64 and 66 respectively. The spur gear 58 meshes with a gear 68 (see Fig. 12) keyed to a tubular member 69 rotatably mounted on a shaft 70 journalled in bearings 72 and 76 which are mounted in the gear retaining cap 78 and the end frame 80 respectively, each of which are attached to the frame 22 by suitable screws. Intermediate the tubular member 69 and shaft 70 is mounted a bushing 79. As best seen in Fig. 8 member 69 terminates in radial teeth 82 which cooperate with the teeth 84 integral with member 86 splined on the shaft 70. Also splined on the shaft 70 is spiral cam 85 which cooperates with a cam follower 87 mounted on a pin 89 carried by a rack 88 and held in position by set screw 91. As the cam 85 is rotated, the rack 88 will be urged downwardly as viewed in Fig. 3 so as to feed the tool carrier or spindle 34 toward the work piece through a driving connection consisting of a gear member 92, which is rotatably mounted upon the shaft 94, meshing with the teeth 93 on the rack 88. Gear 92 cooperates with gear member 112 meshing with the teeth 113 provided therefor on the quill 40 to feed the tool carrier 45 to the work.

Gear 92 terminates in a frustro-conical surface 95 cooperating with a recess in gear 112 having a frustro-conical inner surface so as to permit the adjustment of the distance of the work carrier from the work piece. Gears 92 and 112 are held in frictional engagement by a nut 126 threadedly engaging the end of shaft 94, and by the shoulder 120 provided by collar 122 integral with the shaft 94. Upon the loosening of the nut 126, gear 112 is biased from gear 92 by a helical spring 118 mounted on the shaft 94 and positioned in a recess in gear 92 provided therefor. Adjustment of the work carrier or spindle 34 is limited by pin 114 carried by gear 112 which travels in an arcuate slot 116 in gear 92. As best seen in Fig. 3, gears 92 and 112 are limited in their relative angular movement by the length of the slot 116. The end of the shaft 94 terminates in the square portion 128 which permits the operator to adjust the spindle 34 without dismantling the machine.

The mechanism for retracting the work spindle 34 from the work piece 15 comprises, as best seen in Figs. 4 and 7, a spiral spring 96 which has a hooked end 98 engaging a recess provided therefor in a cylindrical portion 102 integral with gear 92 and a hooked end 103 engaging a recess in the cup-shaped member 104 which is rotatably mounted in the end frame 80. In order to adjust the tension of the spring 96, member 104 has been provided with a ratchet 105 which cooperates with a pawl 106 mounted on a pin 108 carried by the end frame 80. The spring 96 urges the spindle 34 away from the work piece and the cam follower 87 upwardly as viewed in Fig. 3.

A device has been provided to stop the mechanism from reciprocating the spindle 34 after it has been retracted to the "up" position as viewed in Fig. 8. This stopping device consists of a cam projection 130 integral with member 86 which engages a releasing lever 132 mounted on a pivot 134 carried by the frame 22. In Figs. 3, 5 and 8 it may be seen that as the cam projection 130 strikes the lever 132, member 86 will be biased against the force of the helical spring 136 so as to disengage the radial teeth 82 and 84 whereby member 69 will rotate without rotating member 86 and the parts driven thereby. When the operator desires to have the spindle 34 reciprocated he presses upwardly on the rod 139 as viewed in Fig. 3 by mechanism which will appear more fully later. The rod 139 is pivotally connected to lever 132 and biased downwardly as viewed in Fig. 3 by a spring 140 so as to rotate the lever 132 in a counterclockwise direction as viewed in Fig. 3 whereby lever 132 clears the cam projection 130 permitting the spring 136 to actuate member 86 so that the teeth 82 and 84 may engage. When it is desired to use a drill press with an automatic work presenting device as here disclosed and that will appear more fully later, the rod 139 may be held in the "up" position as viewed in Fig. 3 by a lever 142 pivotally connected to a bracket 144 attached to the standard 145 and held in a down position by a rod 146 connected to a treadle, not shown. When the rod 139 is held in the up position as viewed in Figs. 2 and 3 the cam projection 130 will clear the lever 132 without disengaging the teeth 82 and 84.

The tool carrier 45 comprises a housing 150 provided with a cap 152 having a split collar 154 which snugly fits around the flared end 41 of the quill 40. When this tool carrier 45 has been placed in position upon the flared end 41 of the quill 40, it is clamped in position by means of a bolt 156 engaging the two ends of the split collar 154.

In order to relieve the torsion on the quill 40 the cap 152 carries a bushing 158 which cooperates with the rod 160 keyed to a block 162 which is attached to the frame 22 by suitable screws, 162a. The block 162 also holds the key 48 in position so that it cannot be moved out of its key seat.

A gear 164 keyed to the spindle 34 and held in position by a nut 166 threadedly engaging the end of the spindle 34, cooperates with a gear 168 keyed to the rotary chuck 172 which is journalled in the bearings 176 and 178 carried in the housing 150 and which is held in position by the nut 184 threadedly engaging the chuck 172. When it is desired to change the tool 186 such as a drill or a reamer carried by the chuck 172, the operator turns the set screw 188 threadedly engaging the chuck 172 and passing through an opening in the cap 152 so as to force the tool downwardly as viewed in Fig. 11.

The gear 164 also meshes with a gear 170, keyed to a rotary chuck 174 which is journalled in bearings 180 and 182 seated in the housing 150 and which is held in position by the nut 190, threadedly engaging the chuck 174. Set screw 192 similar to the set screw 188 is used to remove the tool 194 from chuck 174. A pair of circular plates 196 and 198 hold the bearings 178 and 182 in position.

It can readily be seen that as the spindle 34 is rotated by the tubular sleeve 30, which is driven through the gear mechanism 24 and 28 by the motor 20, the tools 186 and 194 will be rotated through the gears 168 and 170, respectively, engaging the gear 164. The rotary spindle 34 always rotates in the same direction regardless of the position of tool carrier 45 so that the tools will continuously rotate both when the tool carrier advances toward and retracts from the work.

A suitable mechanism for presenting the work to the operating position has been provided. This comprises a rotary drum 200 carried by the shaft 202 and keyed thereto by a set screw 203, the shaft 202 being journalled in the brackets 204 and 206 attached to the base 208.

The rotary drum 200 is provided with a plurality of sets of work supports 210. Each set of work supports comprises a collar 212 having teeth 214 which fit intermediate the riser bars 17 in contact with each commutator segment 16. It can be readily seen that rotation of the commutator 15 is prevented by the riser bars 17 engaging the teeth 214.

The drum 200 carries bushings 220 mounted intermediate each paired set of supports 210, which cooperates with a tapered pin 222 carried by a pivotally mounted lever 224 pivoted on a pin 225 carried by brackets 226 attached to the standard 144 by suitable screws so as to align and anchor the drum. The lever 224 is normally rotated in a counterclockwise direction as viewed in Fig. 1 by a spring 228 seated in a recess 230 in the standard 145, and in a recess 232 in a lug 234 integral with the bracket 224. The counterclockwise rotation of lever 224 is limited by a set screw 236 carried by a lug 238 integral with the bracket 224 and held in adjusted position by a lock and nut 236a. The limit of the counterclockwise rotation of the lever 224 may be adjusted by adjusting the set screw 236. After the drum 200 has been indexed by a mechanism which will appear more fully later, the lever 224 is rotated in a clockwise direction as viewed in Fig. 1 against the force of the spring 228 by a cam actuated rod 240 moved downwardly as viewed in Fig. 1 by a cam 242 keyed to the shaft 70 and engaging a cam follower 244 mounted in a bifurcated end of the link 246 carried by the guide 248 attached to the end frame 80 by suitable screws. The rod 240 screw-threadedly engages link 246. As the cam 242 is keyed to the end of the shaft 70, the cam 242 rotates through one revolution while the quill 40 and the tool carrier 45 pass through one cycle.

The lever 224 is provided with a pair of arms 250 and 252 which engage the top of the commutators after the drum 200 has been indexed so as to clamp the commutators in position. It frequently happens that the commutators vary slightly in length. In order to accommodate this variation in length, a spring 254 is mounted on the rod 240 so as to resiliently bias the arms 250 and 252 downwardly.

The mechanism for indexing the rotary drum 200 comprises a link 260 attached to a pin 262 adjustably mounted in a groove 264 in the cam 242. The other end of the link 260 is connected to a bracket 266 rotatably mounted on the shaft 202 and carrying a dog 268 cooperating with the teeth on the ratchet 270 keyed to the shaft 202 so that as the link is moved downwardly as viewed in Fig. 1, the drum 200 is rotated through an angle of 45°, thereby presenting another pair of commutators to the operating station.

The operator places a pair of commutators in the set of supports at station A, as seen in Figs. 1 and 2, during a rest period of the drum 200. While the operator is inserting the commutators at station A the commutators found at station B are reamed by the reamers 186 and 194. The brackets 250 and 252 prevent the commutators 15 located at station B from following the reamers 186 and 194 while these are being retracted by the tool carriage 45. After the reamers 186 and 194 have been retracted sufficiently far so as to clear the commutators the cam 242 permits the spring 228 to raise the brackets 250 and 252 away from the commutators. The drum is now indexed by the link 260 rotating the bracket 266 in a counterclockwise direction as viewed in Fig. 1 so as to move the commutators that have been reamed away from station B and so as to advance the commutators inserted at station A to station B. The commutators that have been reamed fall from the rotary drum into a suitable receptacle, not shown. In the indexing of the drum by the indexing mechanism the drum is not always accurately positioned. The pin 222 carried by the bracket 224 aligns the bushing 220 so as to accurately position the commutators with respect to the reamers 186 and 194. By securing the treadle not shown so that the rod 146 is held in the down position the machine will repeat the above cycle so as to index, align, clamp and ream the commutators placed on succeeding sets of supports.

In the modification disclosed, two commutators are reamed at the same time. With a slight modification any number of commutators may be reamed simultaneously by providing more supports in each set and more reamers.

While the form of embodiment of the present invention as herein disclosed, constitutes a preferred form, it is to be understood that other forms might be adopted, all coming within the scope of the claim which follows.

What is claimed is as follows:

In a device for reaming commutators, a work support for a commutator having equally spaced riser bars, said work support comprising an annular member having projecting teeth adapted to engage the periphery of the commutator to properly position said commutator with respect to the reamer tool and extending between the riser bars so as to prevent rotation of the commutator during the reaming operation, said projecting teeth also being effective to prevent the insertion into the work support of a commutator having riser bars exceeding an allowable variation in spacing.

LORA E. POOLE.